United States Patent [19]

Freitag

[11] 3,995,842
[45] Dec. 7, 1976

[54] PNEUMATIC SPRING WITH SAFETY RELEASE

[75] Inventor: Herbert Freitag, Koblenz-Metternich, Germany

[73] Assignee: Stabilus GmbH, Koblenz-Neuendorf, Germany

[22] Filed: Dec. 2, 1975

[21] Appl. No.: 637,071

[30] Foreign Application Priority Data

Dec. 7, 1974  Germany .......................... 2457938

[52] U.S. Cl. .............................. 267/64 R; 267/113; 188/1 C
[51] Int. Cl.² .......................................... F16F 5/00
[58] Field of Search ................ 267/64 R, 113, 120, 267/124, 116, 139; 285/2, 4, 3, 419, 373; 296/50, 56, 57 R, 57 A; 222/396, 397; 220/207, 89 A; 102/2; 188/1 C; 241/31

[56] References Cited
UNITED STATES PATENTS

| | | | |
|---|---|---|---|
| 3,292,826 | 12/1966 | Abplanalp | 222/397 |
| 3,856,287 | 12/1974 | Freitag | 267/64 R |
| 3,918,610 | 11/1975 | Willis | 220/207 |

Primary Examiner—James B. Marbert
Attorney, Agent, or Firm—Hans Berman

[57] ABSTRACT

A pneumatic spring of the piston-and-cylinder type for use with the engine compartment hood or trunk lid of a motorcar and subject to explosive destruction in the event of an engine fire or a collision is provided with frangible, reduced wall portions in the cylinder and/or in the tubular piston rod which yields under excessive stresses and releases the compressed gas from the cylinder under conditions in which it cannot propel pieces of the fractured spring at high velocity.

6 Claims, 1 Drawing Figure

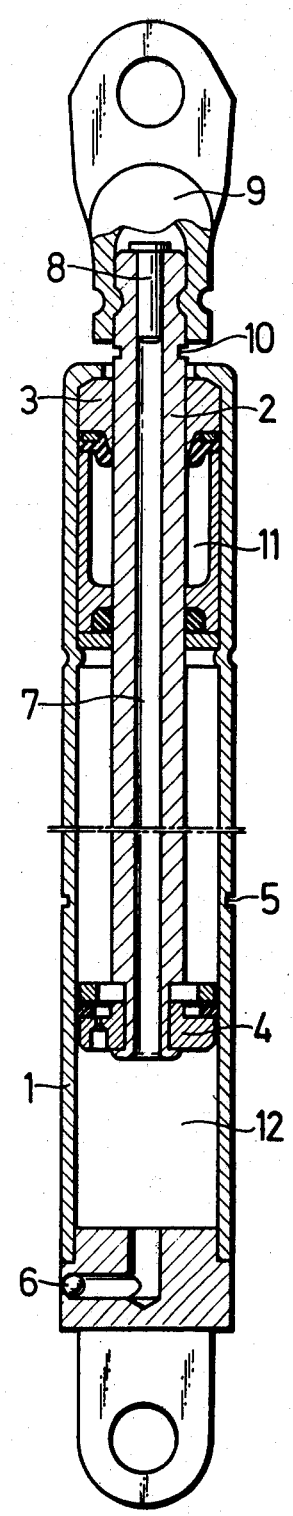

PNEUMATIC SPRING WITH SAFETY RELEASE

This invention relates to pneumatic springs of the piston-and-cylinder type, and particularly to a pneumatic spring equipped with a safety release for its compressed gas charge.

Pneumatic springs are being used increasingly for balancing the engine-compartment hoods and trunk lids of passenger cars. They have significant advantages over the helical compression springs which were used universally before the introduction of pneumatic springs.

It has now been found in crash tests that pneumatic springs under engine-compartment hoods or trunk lids are much more likely to be damaged in collisions than similar springs used in wheel suspensions, and that the compressed gas charge of a pneumatic spring may scatter broken pieces of the piston rod and other parts at deadly velocities like shrapnel. An engine first may cause a pneumatic spring under the hood to explode under the thermal stress with similar consequences.

It is a primary object of this invention to make otherwise conventional pneumatic springs safer for use in relatively unprotected portions of a motorcar.

With this object and others in view, the invention provides the cylinder or the piston rod of a pneumatic spring with a normally closed frangible safety valve arrangement which responds to a predetermined stress, higher than the normal operating stress in the cylinder or piston rod, by releasing the body of compressed gas from the spring to the atmosphere through an aperture in the cylinder or piston rod.

Other features and the attendant advantages of this invention will readily become apparent from the following description of a preferred embodiment when considered in connection with the appended drawing whose sole FIGURE shows a pneumatic spring of the invention in axial section.

The normally visible elements of the spring exposed to the atmosphere consists of a cylinder 1, a piston rod 2 projecting from one axial end of the cylinder 1, and fastening eyes 9 attached to the visible outer end of the piston rod and to the axially opposite end wall of the cylinder 1. The piston rod 2 passes outward of the cylinder cavity through an oil-filled, annular chamber 11 in a guiding and sealing assembly 3. The inner end of the piston rod 2 carries a piston 4 which is axially movable in the cylinder cavity in sealing engagement with the axial, inner cylinder wall and divides the cavity into two axial compartments connected only by throttling passages in the cylinder. A body 12 of a gas, usually air or nitrogen under a pressure many times higher than atmospheric pressure, fills the two compartments and the connecting throttling passages and tends to expel the piston rod from the cylinder cavity. A check valve 6 normally seals an opening in the cylinder bottom, but permits the cylinder cavity to be charged or replenished with compressed gas. The structure described so far is conventional.

According to this invention, the otherwise smoothly cylindrical, axial wall of the cylinder 1 is formed with a groove 5 in a portion of its outer face axially coextensive with the central portion of the gas-filled cylinder cavity. The groove 5 is elongated circumferentially in the cylinder wall and extends in a closed circular loop about the cylinder axis. Its depths is almost one half of the wall thickness of the cylinder 1 so that the wall portion of reduced thickness which constitutes the bottom of the groove is the weakest part of the entire cylinder 1 which is exposed to the high pressure of the gas body 12.

If the cylinder 1 is subjected to stresses higher than its normal operating stresses, the frangible, reduced wall portion under the groove 5 will yield first and provide an aperture in the cylinder which permits harmless escape of the compressed gas 12.

The piston rod 2 is formed with an axial bore 7 permanently communicating with the cylinder cavity remote from the guiding and sealing assembly 3. The portion of the bore 7 in the outer end portion of the piston rod is sealed by a stud 8 whose head is soldered to the radial end face of the piston rod 2 in a manner not specifically shown in the drawing. The outer end of the piston rod is received in a socket of the associated fastening eye 9, and is formed with an annular, circumferential groove 10 closely adjacent the eye 9 in its otherwise smoothly cylindrical outer face. The depth of the groove 10 is approximately one third of the normal wall thickness of the piston rod, and the wall portion of reduced thickness which constitutes the bottom of the groove 10 is strong enough to withstand all normal operating stresses.

A piston rod of a conventional pneumatic spring may be broken axially under excessive stresses into pieces which are then ejected from the cylinder as from an airgun since they are no longer retained by the piston. If the piston rod 2 is subjected to destructive stress, the bottom of the groove 10 yields first, and the compressed gas 12 can escape harmlessly to the atmosphere. The associated eye 9 normally remains fastened to the remainder of the car structure, and the long piece of the piston rod still attached to the piston 4 is relieved of gas pressure before it may suffer damage.

While the illustrated pneumatic spring is equipped with wall portions of reduced thickness in both the piston rod and the cylinder, only one of the two frangible wall portions may be adequate under some conditions. Thus, a pneumatic spring under the engine compartment hood may be located where it is adequately protected against mechanical damage, but still subject to explosion when its gas charge is overheated. Such a pneumatic spring may do without the groove 10 in the piston rod. A spring under a trunk lid is less likely to be exposed to fire than to mechanical stresses in a collision, and may be adequately safened by a groove 10 in its piston rod alone.

While the depth of the grooves 5, 10 will be chosen to suit specific applications, the depth of such grooves preferably should be between 25% and 75% of the wall thickness, reducing the thickness of the wall at the groove bottom to 75% to 25% of that of axially adjoining wall portions. Circumferentially elongated grooves are generally preferred over grooves elongated in other directions, and over recesses having approximately equal axial and circumferential dimensions.

It is not normally practical nor necessary to form a blind, axial bore in the piston rod 2, but the outer end of the bore may be sealed otherwise than as specifically illustrated. A plug or sealing disc of elastomeric material has been found very satisfactory if backed axially by abutting engagement with the fastening eye 9. If the hollow interior of the fastening eye is adequately sealed from the atmosphere, the eye actually constitutes a portion of the piston rod and may itself be formed with a frangible wall portion of reduced thickness as by a groove of the type shown at 10. The cavity in the eye 9 then may freely communicate with the bore 7 whose outer end may remain open.

Other variations of the illustrated pneumatic spring will readily suggest themselves to those skilled in the art. It should be understood, therefore, that the foregoing disclosure relates only to a preferred embodiment of the invention, and that it is intended to cover all changes and modifications of the example of the invention chosen herein for the purpose of the disclosure which do not constitute departures from the spirit and scope of the invention set forth in the appended claims.

What is claimed is:

1. A pneumatic spring comprising:
   a. a cylinder member having an axis and defining a cavity therein,
      1. said cylinder member being formed with a circumferentially elongated groove open toward the atmosphere outside said cavity,
      2. a wall portion of said cylinder being of reduced thickness, said wall portion forming the bottom of said groove and separating said cavity from said atmosphere;
   b. a piston axially movable in said cavity and separating two compartments in said cavity, said piston being formed with a throttling passage connecting said compartments;
   c. a piston rod member having an inner end portion fastened to said piston for joint axial movement and an outer end portion in the atmosphere outside said cavity, said piston rod member passing through said cylinder member in sealing engagement; and
   d. a body of gas in said compartments under a pressure higher than the pressure of said atmosphere,
      1. said wall portion constituting normally closed, frangible safety valve means responsive to a predetermined stress in said cylinder member for releasing said body of gas to said atmosphere through an aperture in said cylinder member.

2. A spring as set forth in claim 1, wherein said cavity is axially elongated, said groove being axially coextensive with the axially central portion of said cavity.

3. A spring as set forth in claim 1, wherein said piston rod member includes a wall separating said body from said atmosphere, a portion of said wall being of reduced thickness and constituting further safety valve means.

4. A pneumatic spring comprising:
   a. a cylinder member having an axis and defining a cavity therein;
   b. a piston axially movable in said cavity and separating two compartments in said cavity, said piston being formed with a throttling passage connecting said compartments;
   c. a piston rod member having an inner end portion fastened to said piston in said cavity for joint axial movement and an outer end portion in the atmosphere outside said cavity, said piston rod member passing through said cylinder member in sealing engagement,
      1. said piston rod member being formed with a bore extending into said end portions and communicating with one of said compartments,
      2. said outer end portion having a wall separating said bore from said atmosphere, a portion of said wall being of reduced thickness; and
   d. a body of gas in said compartments under a pressure higher than the pressure of said atmosphere,
      1. said portion of said wall constituting normally closed, frangible safety valve means responsive to a predetermined stress in said piston rod member for releasing said body of gas to said atmosphere through an aperture in said piston rod member.

5. A spring as set forth in claim 4, wherein said cylinder member includes a wall separating said body from said atmosphere, a portion of said wall of said cylinder member being of reduced thickness and constituting further safety valve means.

6. A spring as set forth in claim 4, wherein said outer end portion is formed with a circumferentially elongated groove, said wall portion of reduced thickness forming the bottom of said groove.

* * * * *